United States Patent [19]
Scherb et al.

[11] 3,776,063
[45] Dec. 4, 1973

[54] ARRANGEMENT FOR FORCING TWO ABUTMENTS APART

[75] Inventors: Gustav Scherb, Linz; Norbert Auer, Traun; Horst Obereder, Oftering; Nikolaus Stollmayer, Hart, all of Austria

[73] Assignee: Vereinigte Osterreichische Eisen-und Stahlwerke Aktiengesellschaft, Linz, Austria

[22] Filed: Feb. 8, 1972

[21] Appl. No.: 224,575

[30] Foreign Application Priority Data
Feb. 26, 1971   Austria .............................. 1645/71

[52] U.S. Cl. ................................................ 74/520
[51] Int. Cl. ............................................. G05g 1/04
[58] Field of Search ................. 74/520; 83/630, 632

[56] References Cited
FOREIGN PATENTS OR APPLICATIONS
502,871   3/1939   Great Britain ........................ 74/520

*Primary Examiner*—Milton Kaufman
*Assistant Examiner*—Frank H. McKenzie, Jr.
*Attorney*—Kurt Kelman

[57] ABSTRACT

Two abutments are adapted to approach each other and to be forced apart in a predetermined direction. Each of said abutments has a confronting surface, which faces the other abutment. An arrangement for forcing said abutments apart comprises two outer rolling elements, each of which is rigidly connected to one of said abutments at said confronting surface thereof and extends transversely to said predetermined direction, a central rolling element which is movable transversely to its axis and to said predetermined direction, two intermediate rolling elements, each of which connects one of said outer rolling elements to said central rolling element, and drive means operable to displace said central rolling element transversely to its axis and to said predetermined direction. All said rolling elements have parallel axes. The arrangement is such that any two adjacent ones of said rolling elements roll one on the other in response to a displacement of said central rolling element.

8 Claims, 3 Drawing Figures

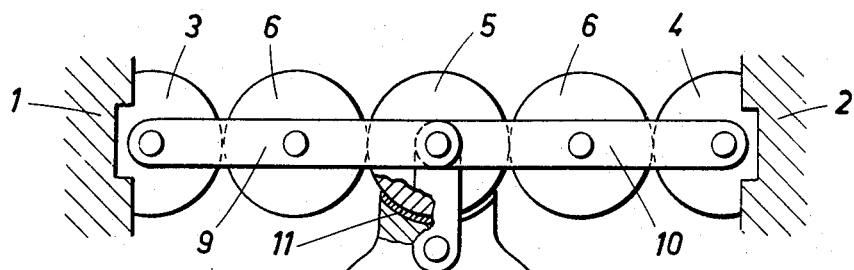
FIG.1
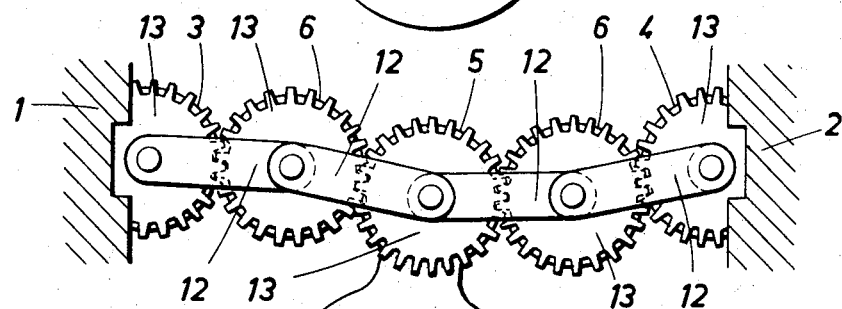
FIG.2
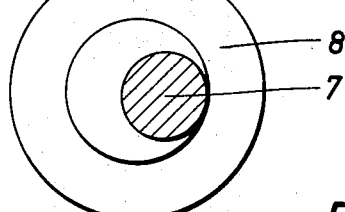
FIG.3
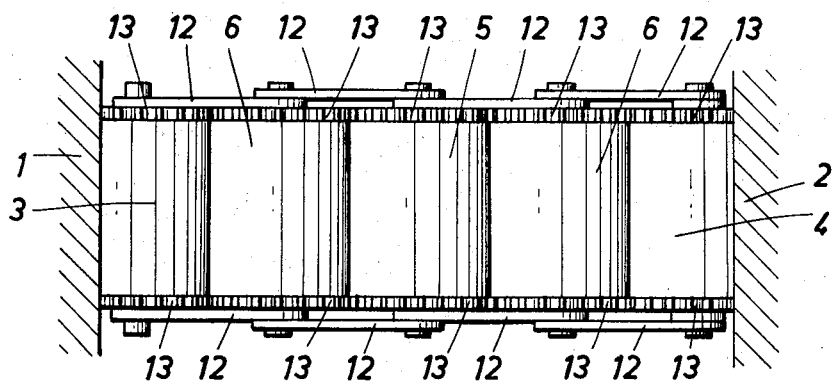

ARRANGEMENT FOR FORCING TWO ABUTMENTS APART

BACKGROUND OF THE INVENTION

Strong forces must be applied to operate heavy shears, presses or the like and are produced with the aid of lever transmissions, screws and the like. The magnitude of the output forces or torques which are available depends on the transmission ratio and efficiency of the arrangement which is employed, and the efficiency depends on the effective coefficients of friction. To enable the use of a highly efficient and comparatively small drive for such arrangements, care must be taken to minimize the coefficients of friction in bearings or the like. Special attention is directed for this reason to the bearings, which are lubricated well. Where plain bearings are used, the lubrication thereof requires a hydraulic system, which must be dimensioned to resist the forces which are encountered. Where such high structural expenditures are to be avoided, anti-friction bearings may be used, although they have relatively large dimensions and are correspondingly expensive where large forces are to be taken up.

It is known to operate heavy shears, presses or the like by so-called toggle joints, to the central hinge of which the driving force is applied from a crank drive or the like.

In such an arrangement, the pivot pins for the levers are rotatably mounted in anti-friction bearings or where very large forces are encountered, in plain bearings. Where anti-friction bearings are employed, the structural dimensions and with them the costs thereof increase strongly with the effective forces. On the other hand, plain bearings involve an additional expenditure due to the need for lubricating means. In this case, special requirements regarding the relative velocity of the bearing surfaces and the temperature must be met. These requirements may render the use of plain bearings more difficult or impossible under certain circumstances, e.g., where starting under load is required.

It is an object of the invention to eliminate these disadvantages and to provide an arrangement for forcing two abutments apart with a strong force, particularly in shears or presses, in which arrangement the friction is minimized to ensure an optimum utilization of the driving energy.

The object of the invention is substantially accomplished in that the two abutments are rigidly connected at mutually confronting sides with respective rolling elements, which extend transversely to the direction of movement of the abutments, and which by means of respective intermediate rolling elements are connected to a common central rolling element, which by a drive means, preferably a crank drive means, is movable transversely to its axis and transversely to the direction of movement of the abutments, all rolling elements having parallel axes, and any adjacent rolling elements rolling one on the other in response to a displacement of the central rolling element. The arrangement according to the invention acts like a toggle joint in which the several lever elements are replaced by rolling elements rolling one on the other. Because the rolling elements roll only on each other, a displacement of the central rolling element will cause the two abutments to be forced apart until the axes of all rolling elements lie in a plane. The pressure applied to the two abutments acts fully on each rolling element but does not act on its bearings so that only the resistance which is due to the rolling friction between adjacent rolling elements must be overcome in the operation of the arrangement according to the invention. It will be understood that the use of the arrangement according to the invention eliminates the need for the bearings required in the known arrangements as well as the difficulties involved therein.

In a special embodiment of the invention, the rolling elements are held together by pairs of straps or the like by which the shaft of each rolling element rigidly connected to an abutment is connected to the shaft of the central rolling element and to the shaft of the intermediate rolling element, in an arrangement in which the central rolling element is adapted to be driven only for a displacement parallel to itself. In this arrangement, the central rolling element must not perform a rotary motion because in this case a strict rolling of each rolling element on another would no longer be ensured. Where a crank drive is provided to drive the central rolling element, the connecting rod of such crank drive must be connected to the central rolling element by a bearing so that the rotation of the connecting rod cannot be transmitted to the rolling element.

Another embodiment of the invention is characterized in that the shaft of each rolling element is connected by respective pairs of straps to the shafts of adjacent rolling elements and the central rolling element rotates in unison with the connecting rod of the crank drive. In this embodiment, the connecting rod of the crank drive is fixedly connected to the central rolling element.

In another embodiment of the invention, it is ensured that the rolling elements roll only one on the other in that the rolling elements are provided at least at one end face with gear segments, gear discs or the like, which have pitch circle diameters corresponding to the diameter of the rolling element and mesh with each other. The meshing gears act mainly as a synchronizer when the force-transmitting connection between adjacent rolling elements is interrupted. This may occur particularly during a return movement of the arrangement to its initial position. The gear discs which are fixedly connected to the rolling elements have also the advantage of ensuring an assembling of the rolling elements exactly in a predetermined position. When the rolling elements exhibit wear, they may be rotated to a different position and fixed therein for continued use.

To eliminate the need for an entirely new set of teeth when individual teeth have been damaged, the gear segments, gear discs or the like can be removed and shifted by an integral number of tooth pitches and then be secured again to the rolling elements.

Embodiments of the invention are shown diagrammatically and by way of example on the accompanying drawing, in which FIG. 1 is a side elevation of an arrangement according to the invention for forcing two abutments apart.

FIG. 2 is also a side elevation and shows another embodiment of the arrangement according to the invention and FIG. 3 is a top plan view showing the arrangement of FIG. 2.

Five rolling elements are arranged in a row between two abutments 1, 2. The two outermost ones 3, 4 of these rolling elements are fixedly connected each to one of the abutments. The central rolling element 5 is connected to the rolling elements 3, 4 by respective intermediate rolling elements 6 to the rolling elements 3, 4, which are rigidly connected to the abutments 1 and 2. A crank drive consisting of a crankshaft 7 and a connecting rod 8 serves to drive the central rolling element 5 transversely to its axis and transversely to the direction of movement of the abutments.

In the arrangement shown in FIG. 1, the shafts of the rolling elements 3, 6, and 5 are connected by a pair of straps 9, and the shafts of the rolling elements 4, 6, and 5 are connected by an additional pair of straps 10. The connecting rod 8 is rotatably mounted on the shaft of the central rolling element 5 and forms a plain bearing 11 for the rolling element 5. If the crank drive 7, 8 is operated to displace the central rolling element 5 parallel to itself, the remaining rolling elements roll one on the other and the abutments 1 and 2 are forced apart, as by a toggle joint. The pressure forces applied to the abutments 1 and 2 are transmitted only by the rolling elements, which roll one on the other, so that substantial bearing friction cannot arise. In an embodiment of the invention such as is shown in FIG. 1 it is important that the central rolling element 5 does not rotate in unison with the connecting rod 8 because this would necessarily result in sliding friction between individual rolling elements in view of the kinematic relations. The abutments 1 and 2 are forced apart until the shafts of the rolling elements lie in a plane, as is shown in FIG. 1. When the abutments are retracted, during the idle stroke, the transmission of force between adjacent rolling elements may be interrupted because there is inevitably a bearing clearance of the shafts in the straps. Because the idle stroke does not involve substantial forces, the friction losses due this phenomenon are not excessive. These losses can be prevented, however, if the shafts of adjacent rolling elements are pulled toward each other by spring so that a transmission of force is always ensured.

FIG. 2 shows another embodiment of the arrangement according to the invention. Different from FIG. 1, the shafts of the rolling elements are not connected by two pairs of straps, but the shaft of each rolling element is connected to the shafts of adjacent rolling elements by respective pairs of straps 12. In this arrangement, the connecting rod 8 is fixedly connected to the central rolling element 5 so that the latter rotates in unison with the connecting rod.

Gear discs 13 are mounted on the end faces of the rolling elements and the pitch circle diameter of these gear discs is equal to the diameter of the rolling elements. These gear discs 13 mesh with one another and reliably prevent a slipping of one rolling element on another. Besides, when the transmission of force between adjacent rolling elements is interrupted during the retracting of the arrangement to its initial position, the gear discs 13 synchronize the rotational movements of the rolling elements.

When rolling elements have become damaged, they may be shifted by an integral number of tooth pitches and reassembled in the resulting positions, which are determined by means of the gears, so that the damaged portion of the peripheral surface no longer contacts the adjacent rolling element.

What is claimed is:

1. A mechanism which comprises two abutments adapted to approach each other and to be forced apart in a predetermined direction, each of said abutments having a confronting surface, which faces the other abutment, and an arrangement for forcing said abutments apart, which arrangement comprises two outer rolling elements, each of which is rigidly connected to one of said abutments at said confronting surface thereof and extends transversely to said predetermined direction, a central rolling element which is movable transversely to its axis and to said predetermined direction, two intermediate rolling elements, each of which connects one of said outer rolling elements to said central rolling element, all said rolling elements having parallel axes, and drive means operable to displace said central rolling element transversely to its axis and to said predetermined direction, the arrangement being such that any two adjacent ones of said rolling elements roll one on the other in response to a displacement of said central rolling element.

2. A mechanism as set forth in claim 1, in which each of said rolling elements comprises a shaft, a first pair of straps connect the shafts of one of said outer rolling elements, the intermediate rolling element adjacent thereto and said central rolling element, a second pair of straps connect the shafts of the other of said outer rolling element, the adjacent intermediate rolling element adjacent thereto, and said central rolling element, and said drive means are operable to displace said central rolling element only parallel to itself.

3. A mechanism as set forth in claim 2, in which each of said rolling element comprises a shaft, the shafts of any two adjacent rolling elements are connected by a pair of straps, and said crank drive comprises a connecting rod connected to said central rolling element so as to rotate the latter in unison with said connecting rod.

4. A mechanism as set forth in claim 1, in which said drive means consist of a crank drive.

5. A mechanism as set forth in claim 1, in which each rolling element is provided with a peripheral series of gear teeth at least on one side of said mechanism, each of said series of gear teeth has a pitch circle diameter which is equal to the diameter of the respective rolling element, and said series of gear teeth of any two adjacent ones of said rolling elements are in mesh.

6. A mechanism as set forth in claim 5, in which at least one of said peripheral series of gear teeth extends only around part of the periphery of the respective rolling element.

7. A mechanism as set forth in claim 5, in which at least one of said peripheral series of gear teeth extends throughout the periphery of the respective rolling element.

8. A mechanism as set forth in claim 5, in which each of said peripheral series of gear teeth is detachably secured to the respective rolling element.

* * * * *